US009175233B2

(12) United States Patent
Goldstein et al.

(10) Patent No.: US 9,175,233 B2
(45) Date of Patent: Nov. 3, 2015

(54) CATALYTIC REFORMER UNIT AND UNIT OPERATION

(75) Inventors: Stuart S. Goldstein, Southampton (GB); John H. Thurtoll, Centreville, VA (US); Bal K. Kaul, Fairfax, VA (US); Greg A. Marshall, Kingwood, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 1468 days.

(21) Appl. No.: 11/795,549

(22) PCT Filed: Jan. 23, 2006

(86) PCT No.: PCT/US2006/002294
§ 371 (c)(1),
(2), (4) Date: Dec. 17, 2007

(87) PCT Pub. No.: WO2006/079026
PCT Pub. Date: Jul. 27, 2006

(65) Prior Publication Data
US 2011/0147270 A1 Jun. 23, 2011

Related U.S. Application Data

(60) Provisional application No. 60/645,713, filed on Jan. 21, 2005, provisional application No. 60/741,969, filed on Dec. 2, 2005.

(51) Int. Cl.
*C10G 35/04* (2006.01)
*C10G 47/02* (2006.01)
(Continued)

(52) U.S. Cl.
CPC ............ *C10G 47/02* (2013.01); *B01D 53/0473* (2013.01); *C01B 3/56* (2013.01);
(Continued)

(58) Field of Classification Search
USPC ...... 208/133, 134, 135, 137, 103, 100, 310 R
See application file for complete search history.

(56) References Cited

U.S. PATENT DOCUMENTS 4,077,779 A * 3/1978 Sircar et al. ............... 95/26
4,194,892 A 3/1980 Jones et al.
(Continued)

FOREIGN PATENT DOCUMENTS

| EP | 1004343 B1 | 11/1999 |
| WO | 03044131 A1 | 5/2003 |
| WO | 03068366 A1 | 8/2003 |

OTHER PUBLICATIONS

R. Farrauto, S. Hwang, L. Shore, W. Ruettinger, J. Lampert, T. Giroux, Y. Liu and O. Llinich, "New Material Needs for Hydrocarbon Fuel Processing: Generating Hydrogen for the PEM Fuel Cell," Annual Review of Materials Research, vol. 33: 1-27 (Volume publication date Aug. 2003).

*Primary Examiner* — Michelle Stein
(74) *Attorney, Agent, or Firm* — Bruce M. Bordelon; Larry E. Carter; Chad A. Guice

(57) ABSTRACT

An improved process for catalytic reformers and their use for the catalytic reforming of petroleum naphthas. More particularly, the invention relates to an improved reformer unit which can be operated at higher throughput relative to compressor size. The invention utilizes pressure swing adsorption to improve the hydrogen content of hydrogen containing streams generated by and utilized in catalytic reforming processes. The invention also has the capability of enabling compressor-limited catalytic reforming units to be operated at increased capacities.

19 Claims, 1 Drawing Sheet

(51) Int. Cl.
*B01D 53/047* (2006.01)
*C01B 3/56* (2006.01)
*C10G 47/00* (2006.01)
*C10G 47/18* (2006.01)
*C10G 47/20* (2006.01)
*B01D 53/04* (2006.01)

(52) U.S. Cl.
CPC ............... *C10G 47/00* (2013.01); *C10G 47/18* (2013.01); *C10G 47/20* (2013.01); *B01D 53/0423* (2013.01); *B01D 2253/10* (2013.01); *B01D 2253/104* (2013.01); *B01D 2253/106* (2013.01); *B01D 2253/108* (2013.01); *B01D 2256/16* (2013.01); *B01D 2256/24* (2013.01); *B01D 2257/702* (2013.01); *B01D 2259/403* (2013.01); *C01B 2203/042* (2013.01); *C01B 2203/048* (2013.01); *C10G 2300/1044* (2013.01); *C10G 2300/4081* (2013.01)

(56) References Cited

U.S. PATENT DOCUMENTS

| | | | |
|---|---|---|---|
| 4,247,987 A * | 2/1981 | Coulaloglou et al. | 95/27 |
| 5,332,492 A * | 7/1994 | Maurer et al. | 208/103 |
| 5,540,758 A | 7/1996 | Agrawal et al. | |
| 6,063,161 A | 5/2000 | Keefer et al. | |
| 6,165,350 A | 12/2000 | Lokhandwala et al. | |
| 6,361,583 B1 * | 3/2002 | Pinnau et al. | 95/45 |
| 6,406,523 B1 | 6/2002 | Connor et al. | |
| 6,451,095 B1 * | 9/2002 | Keefer et al. | 96/125 |
| 6,488,747 B1 | 12/2002 | Keefer et al. | |
| 6,533,846 B1 | 3/2003 | Keefer et al. | |
| 6,565,635 B2 | 5/2003 | Keefer et al. | |
| 6,607,584 B2 | 8/2003 | Moreau et al. | |
| 2003/0167921 A1 * | 9/2003 | Golden et al. | 95/96 |
| 2004/0107831 A1 * | 6/2004 | Graham et al. | 95/96 |
| 2004/0255778 A1 | 12/2004 | Reddy | |
| 2006/0118466 A1 | 6/2006 | Galeazzi et al. | |

* cited by examiner

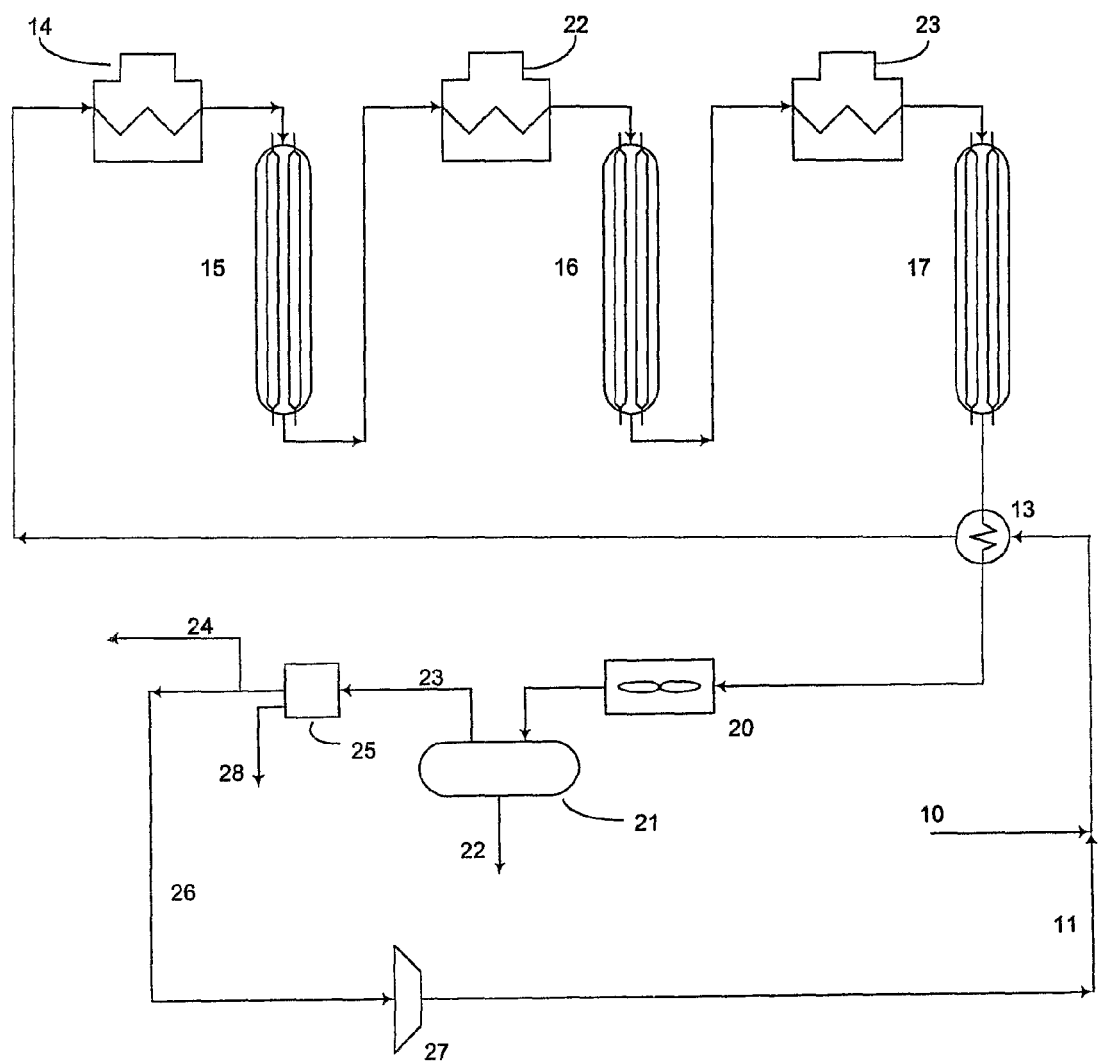

CATALYTIC REFORMER UNIT AND UNIT OPERATION

CROSS-REFERENCE TO RELATED APPLICATION

This application is a National Stage Entry of PCT/US06/02294 filed Jan. 23, 2006, which claims priority to U.S. Patent Application No. 60/741,969 filed Dec. 2, 2005 and U.S. Patent Application No. 60/645,713 filed Jan. 21, 2005.

FIELD OF THE INVENTION

The invention relates generally to catalytic reformers and their use for the catalytic reforming of petroleum naphthas. More particularly, the invention relates to an improved catalytic reformer process which can be operated at higher throughput relative to compressor size. The invention has the capability of enabling compressor-limited reforming units to be operated at greater capacities.

BACKGROUND OF THE INVENTION

Catalytic naphtha reforming is an established petroleum refinery process. It is used for improving the octane quality of hydrocarbon feeds in the naphtha boiling range. Generally, reforming refers to the total effect of molecular changes on a hydrocarbon feed, produced by a number of reactions. Typical reforming reactions include dehydrogenation of cyclohexanes, dehydroisomerization of alkylcyclopentanes, dehydrocyclization of paraffins and olefins, isomerization of substituted aromatics, and hydrocracking of paraffins. Typical reforming catalysts are multifunctional catalysts having a hydrogenation-dehydrogenation component dispersed on a porous, inorganic oxide support. The support typically also contains an acid functionality, normally provided by the use of a halogen, to mediate the reforming reactions.

A reforming unit typically comprises a plurality of serially connected reactors with furnaces for supplying additional heat to the reaction stream as it passes from one reactor to the next in order to compensate for the heat utilized in the overall endothermic character of the process. Conventionally, reforming processes have been operated as semi-regenerative or cyclic processes using fixed bed reactors or as continuous processes such as UOP CCR Platforming™ (Continuous Catalytic Regeneration Platforming™) using moving bed reactors. Proposals have been made for combining fixed and moving bed reactors using regenerators appropriate to the individual reactor types. Units of this hybrid type are disclosed, for example, in U.S. Pat. No. 5,190,638; U.S. Pat. No. 5,190,639; U.S. Pat. No. 5,196,110; U.S. Pat. No. 5,211,838; U.S. Pat. No. 5,221,463; U.S. Pat. No. 5,354,451; U.S. Pat. No. 5,368,720 and U.S. Pat. No. 5,417,843. Similar hybrid reforming units using combinations of fixed bed and moving bed reactors are described in NPRA Paper No. AM-96-50 "IFP Solutions for Revamping Catalytic Reforming Units" (1996 NPRA Annual Meeting, 17-19 Mar. 1996). U.S. Pat. No. 4,498,973 describes a moving bed reforming unit in which two moving bed reactor stacks share a common regenerator. UOP has recently announced its CycleX™ Process for increased hydrogen production from a fixed bed reforming unit by the addition of a circulating catalyst reactor as the final reactor in the reactor sequence. This reactor is provided with its own heater and regenerator as an expansion of existing assets rather than as a substitution of them: NPRA Paper AM-03-93.

Whatever the configuration of the unit, however, fixed bed semi-regenerative, fixed bed cyclic, continuous or hybrid, a hydrogen recycle loop is provided in order to maintain an adequate volume of hydrogen at a suitable pressure in all the reactors. Although the reformer is a net producer of hydrogen, it is necessary to maintain a hydrogen:oil ratio within defined limits in order to minimize catalyst aging. The hydrogen which is has been generated or recycled is not pure and, in fact, typically contains significant quantities of light hydrocarbons which have not been completely removed in the separators which follow the reactor section. The term "light hydrocarbons" used herein means a hydrocarbon mixture comprised of hydrocarbon compounds of about 1 to about 5 carbon atoms in weight (i.e., $C_1$ to $C_5$ weight hydrocarbon compounds). The composition of the recycle gas, together with other process variables is a significant process variable. Reformer units are typically designed for a maximum feed rate, recycle gas rate, and recycle gas composition. Once these maximum design conditions are exceeded, the pressure drop in the system can exceed the ability of the recycle gas compressor to achieve an acceptable recycle rate without increasing system pressure. Increasing the pressure may not, however, be desirable in many cases as it will tend to reduce reformate and hydrogen yields, or the unit may already be operating near the maximum design pressure of the equipment.

We have now devised an improved configuration for catalytic naphtha reforming units which enables recycle gas compressor limitations to be overcome and which enables existing units to be operated at a capacity exceeding those imposed by compressor limitations and new units utilizing such embodiments may be operated at a greater nominal capacity.

SUMMARY OF THE INVENTION

According to one embodiment, a catalytic naphtha reforming process is carried out by removing hydrocarbons from the hydrogen recycle stream by Conventional Pressure Swing Adsorption ("conventional PSA"). In a preferred embodiment, a catalytic reforming process is carried out by removing hydrocarbons from the hydrogen recycle stream by Rapid Cycle Pressure Swing Adsorption ("RCPSA"). The reduction in the proportion of hydrocarbons in the reformer recycle stream increases the hydrogen purity of the stream, a factor which itself is favorable for the reforming mechanisms, but also from the present point of view, has the advantage of reducing the circuit pressure drop with the result that it becomes possible to overcome the limitation imposed by recycle gas compressor and to increase the feed rate commensurately. The extent to which the compressor limitation may be by-passed will depend on the extent to which the hydrocarbons are removed from the recycle stream: with increasing hydrogen purity, the greater will be the potential increase in naphtha feed rate. Accordingly, it is preferred to increase the hydrogen purity of the recycle stream to at least 85% by volume, preferably to at least 90% by volume, more preferably to at least 95% by volume.

In a preferred embodiment, a rapid cycle pressure swing adsorption unit is utilized increases the hydrogen content in both the hydrogen-containing recycle stream and the export hydrogen stream of a catalytic reforming unit.

BRIEF DESCRIPTION OF THE FIGURES

The sole FIGURE herein shows a fixed-bed reforming unit including a pressure swing absorption unit for removing hydrocarbons from the recycle gas loop of a typical catalytic reforming process.

DETAILED DESCRIPTION OF THE INVENTION

This process is applicable to catalytic naphtha reforming, that is to the process in which a hydrocarbon feed in the naphtha boiling range is subjected to reactions at elevated temperature including dehydrogenation, dehydrocyclization, isomerization and hydrocracking to convert aliphatic hydrocarbons in the naphtha feed to aromatics so as to result in a product comprising an increased proportion of aromatics (relative to the feed). Depending on the properties of the naphtha feedstock (as measured by the paraffin, olefin, naphthene, and aromatic content) and catalysts used, the reformate product can be produced with very high concentrations of toluene, benzene, xylene, and other aromatics useful in gasoline blending and petrochemical processing. Hydrogen, a significant by-product, is separated from the reformate for recycling and use in other refinery processes. While the reactions involved in the overall reforming process include both exothermic and endothermic components, the overall reaction is endothermic and requires substantial amounts of process heat to carry it to the desired point. The older type of fixed bed reformers typically operated at moderate to high hydrogen pressures in order to extend the cycle life of the catalyst between regeneration cycles; the more modern continuous catalytic reformers, however, are capable of operating in a lower, more favorable pressure regime. In the present process the actual reforming may be carried out under the conditions appropriate to the unit using the catalyst system selected for the unit. Conditions such as temperature, pressure, feed/recycle ratio, space velocity, may remain unchanged and in accordance with normal operating parameters. If the unit has, however, been compressor limited, the use of the present invention may enable higher feed rates (with any appropriate consequential changes) to be made, as discussed below.

The present invention provides a substantially lower cost option for refiners to make significant improvements to the capacity (throughput) of existing reformer units or, alternatively, to design new units with a greater capacity than would otherwise have been attainable, without improved hydrocarbon separation from the recycle gas stream or an increase in recycle stream compression. The present invention may be applied equally to units with fixed-bed (non-continuous) reactors as well as to units with moving bed (continuous) reactors and to hybrid type units including both fixed bed and moving bed reactors. Fixed bed units may be semi-regenerative catalytic reformers or swing-reactor (also referred to as cyclic regeneration) reformers and may be included in hybrid type systems with both fixed and moving bed sections. Units with moving bed reactor systems and non-integrated regenerators have recently been proposed in U.S. patent application Ser. No. 10/690,081 (Publication No. US-2004-129605-A1); a fixed bed unit converted to moving bed reactor operation with cyclic regeneration is proposed in U.S. patent application Ser. No. 11/096,372, filed 1 Apr. 2005 (based on U.S. Appln. No. 60/564,133, filed 21 Apr. 2004); the present unit is applicable to use in moving bed reactor units such as those.

Cyclic, fixed-bed reformers are well-known. In units of this type, a plurality of reactors are used, typically from three to five, with one reactor at a time being the so-called "swing" reactor. The actual reforming is carried out in the remaining reactors according to the normal reforming reactor sequence while the catalyst in the "swing" reactor is being regenerated by the flow of regeneration gas through the catalyst. In the normal operation sequence, the reactor with the catalyst which has aged the most, is withdrawn from the reforming sequence (taken "off-oil"): after the oil feed is cut off, the catalyst in the vessel is subjected to regeneration sequence typically with a purge of residual hydrocarbons (nitrogen purge), oxidative regeneration to burn off the accumulated coke on the catalyst, halogenative rejuvenation (usually a chlorination treatment), followed by a purge of oxides and residual occluded gases and a final hydrogen reduction, after which the reactor is returned on line by bringing it "on-oil" again while another vessel is taken off-oil for regeneration, so becoming the swing reactor for this part of the operating sequence. The sequence then follows with each reactor in turn becoming the swing reactor on regeneration. Depending on the catalyst used in the unit, a presulfiding step to control initial activity may or may not be used following reduction. Normally, the swing time can range from one to five days. The term regeneration gas is used here to comprehend the various gases used in the regeneration sequence referred to above, including the heated purge gas (usually nitrogen), oxidative gas for coke burn-off, halogenation gas for rejuvenation, purge gas, hydrogen for reduction and, if required by the catalyst chemistry, the pre-sulfiding gas treatment.

Semi-regenerative units typically contain one or more fixed-bed reactors operating in series with inter-bed heaters to maintain operating severity as the catalyst deactivates by increasing the reaction temperature and to maintain the desired temperature profile across the unit as the ratio of endothermic to exothermic reactions increases in successive reactors. Eventually, a semi-regenerative unit is shut down for catalyst regeneration and reactivation in its original mode of operation.

The operation of hybrid type units is described in the patents and other publications referred to above. The operation of units with moving bed reactors and non-integrated regenerators is described in U.S. patent application Ser. No. 10/690,081 (Publication No. US-2004-129605-A1); units with moving bed reactor section and cyclic regeneration sections are disclosed in U.S. patent application Ser. No. 11/096, 372, filed 1 Apr. 2005.

A conventional PSA process may be used to separate the light hydrocarbons from the hydrogen before it is recompressed for the recycle stream. Here, a gas stream is passed under pressure for a period of time over a bed of a solid sorbent which is selective or relatively selective for a component, usually regarded as a contaminant, which is to be removed from the gas stream. It is possible to remove two or more contaminants simultaneously but for convenience, the component or components which are to be removed will be referred to in the singular and referred to as a contaminant. The gas is passed over the sorption bed and emerges from the bed depleted in the contaminant which remains sorbed in the bed. After a predetermined time or, alternatively when a break-through of the contaminant is observed, the flow of gas is switched to another similar bed in a separate vessel for the purification to continue. At the same time, the sorbed contaminant is removed from the original bed by a reduction in pressure, usually accompanied by a reverse flow of gas to desorb the contaminant. As the pressure in the vessels is reduced, the contaminant previously adsorbed on the bed is progressively desorbed into the offgas system which typically comprises a large offgas drum, together with a control system designed to minimize pressure fluctuations to downstream systems. The contaminant can be collected from the off-gas system in any suitable manner and processed further or disposed of as appropriate. When desorption is complete, the sorbent bed may be purged with an inert gas stream e.g. nitrogen or a purified stream of the process gas. Purging may be facilitated by the use of a higher temperature purge gas stream.

The sorption of the contaminants usually takes place by physical sorption onto the sorbent which is normally a porous solid such as alumina, silica or silica-alumina which has an affinity for the contaminant(s). Zeolites are often used in many applications since they may exhibit a significant degree of selectivity for certain contaminants by reason of their controlled and predictable pore sizes. Normally, chemical reaction between the sorbent is not favored in view of the increased difficulty of achieving desorption of species which have become chemically bound to the sorbent but chemisorption is by no means to be excluded if the sorbed materials may be effectively desorbed during the desorption portion of the cycle, e.g. by the use of higher temperatures coupled with the reduction in pressure.

Conventional PSA is usually carried out in a unit with three or more sorption vessels which are switched cyclically between the sorption, desorption and purge modes. Additional vessels may be provided to allow for sorbent change-outs and maintenance. Commercial PSA units are widely available for many different process applications including hydrogen purification.

A preferred type of PSA process is the rapid cycle PSA (RCPSA) process in which the duration of the overall cycle time is significantly reduced, from a number of minutes to multiple cycles per minute. RCPSA utilizes a rotary valving system to conduct the gas flow through a rotary sorber module that contains a number of separate compartments each of which is successively cycled through the sorption and desorption steps as the rotary module completes the cycle of operations. The rotary sorber module is normally comprised of tubes held between two seal plates on either end of the rotary sorber module wherein the seal plates are in contact with a stator comprised of separate manifolds wherein the inlet gas is conducted to the RCPSA tubes and processed purified product gas and the tail gas exiting the RCPSA tubes is conducted away from the rotary sorber module. By suitable arrangement of the seal plates and manifolds, a number of individual compartments may be passing through the characteristic steps of the complete cycle at any one time. In contrast with conventional PSA, the flow and pressure variations required for the sorption/desorption cycle may be changed in a number of separate increments on the order of seconds per cycle, which smoothes out the pressure and flow rate pulsations encountered by the compression and valving machinery. In this form, the RCPSA module includes valving elements angularly spaced around the circular path taken by the rotating sorption module so that each compartment is successively passed to a gas flow path in the appropriate direction and pressure to achieve one of the incremental pressure/flow direction steps in the complete RCPSA cycle. A key advantage of the RCPSA technology is a much more efficient use of the adsorbent material. Since the quantity of adsorbent required with RCPSA technology can be only a fraction of that required for conventional PSA technology to achieve the same separation quantities and qualities. The footprint, investment, and the amount of active adsorbent required for RCPSA is significantly lower than that for a conventional PSA unit processing an equivalent amount of gas.

For the purposes of the present catalytic naphtha reforming process, PSA is used to remove the light hydrocarbons from the gaseous portion of the reformer effluent stream prior to recompression for the recycle loop. The effluent stream from the last reforming reactor is first led to a gas/liquid separator or separators to separate the liquid reforming products mainly comprising the $C_5$ and higher hydrocarbons from the light ends comprising hydrogen (both recycled and produced during the reforming reactions) and light hydrocarbons (mainly $C_5$ and lower hydrocarbons). From the separator, the gaseous stream including the hydrogen and light hydrocarbons is conducted to the PSA unit in which the proportion of light hydrocarbons is reduced by adsorption onto the sorbent. A percentage of the light hydrocarbons are removed from the PSA process as a tail gas and a hydrogen-enriched gaseous stream leaves outlet of the PSA process with a higher concentration of hydrogen than the gaseous stream that was conducted to the inlet of the PSA process. This hydrogen-enriched gaseous stream can then be recycled to the first reformer reactor. If desired, the PSA unit can be located in the recycle gas stream upstream of the catalytic reformer's hydrogen export manifold thereby treating both the gas stream that will be utilized as a reformer recycle gas as well as the net hydrogen exported from the catalytic reforming process.

The FIGURE herein, given for example only, shows a fixed bed catalytic naphtha reformer which may be of the cyclic, semi-regenerative, or continuous regeneration type. The hydrocarbon feed enters through line 10 and is combined with recycle hydrogen from line 11. The combined hydrocarbon/hydrogen feed then passes through heat exchanger 13 in which the stream obtains heat from the effluent from the final reactor (three shown). The combined feed then passes from heat exchanger 13 to a first furnace 14 to bring it to the required temperature to enter first reactor 15 in which the reforming reactions commence. Reactor 15, like the second and third stage reactors 16 and 17, may be either a fixed bed reactor or a continuous catalytic regeneration ("CCR") reactor. The effluent from first stage reactor 15 passes to the second stage reactor 16 by way of second furnace 22 and from second stage reactor 16 in the conventional manner to third stage reactor 17 by way of third furnace 23. The effluent from the third stage reactor passes through heat exchanger 13 to heat the combined recycle/feed stream. The effluent from heat exchanger 13 passes to cooler 20 and then to separator 21. A liquid reformate product 22 is removed from the separator and a combined recycle and export hydrogen stream 23 is also removed from the separator in the vapor phase. Cooler 20 is suitably an air cooler although a water cooler or a combination of air and water coolers is also useful.

The combined recycle and export hydrogen stream 23 from separator 21 still contains appreciable amounts of light hydrocarbons, both from unconverted feed and reformer reaction products. In order to reduce the level of light hydrocarbons in the stream, the combined recycle and export hydrogen stream 23 is conducted to a Pressure Swing Absorbent (PSA) unit, preferably a Rapid Cycle PSA (RCPSA) unit 25. The purified hydrogen recycle and export hydrogen stream 26 leaves the PSA unit 25 with a greater hydrogen content than the combined recycle and export hydrogen stream 23 that was fed to the PSA unit. The stream is then separated into a purified export hydrogen stream 24 and a purified recycle gas stream 26. The purified recycle gas stream 26 is conducted to compressor 27 for entry into the recycle loop through line 11. The light hydrocarbons that are removed in the PSA process are withdrawn as a tail gas stream 28 and passed to the fuel gas system or separated into fractions which can be used in other units. Depending on the specific RCPSA design, other contaminants, such as, but not limited to $CO_2$, water, ammonia, and $H_2S$ may also be removed from the hydrogen-containing make-up gas.

It should be noted that although the purified export hydrogen is shown in the FIGURE as being removed from the recycle gas stream prior to the compressor in the FIGURE, that in one embodiment, the purified export hydrogen may be withdrawn from the combined stream after the compressor if additional stream pressure is required for the purified export hydrogen stream. The quality of the separation in the PSA can be enhanced at higher pressures and if the feed to the PSA is at higher pressure, the exhaust (desorption) gas from the PSA may be at a sufficiently high pressure to be used economically without additional compression before being sent to the fuel gas header or other downstream use within the refinery.

In still another embodiment, the purified export hydrogen may be withdrawn after separator 21 and prior to the PSA unit 25. This particular embodiment may be useful when either the hydrogen content of the export hydrogen is sufficient without further improvements or the main objective is to increase the amount of hydrogen in the recycle stream to either improve the hydrogen partial pressure and/or hydrogen volume available in the catalytic reforming reactions.

In a specific embodiment, the combined recycle hydrogen and export hydrogen stream may have a hydrogen concentration as low as 55% (for high pressure semi regen units) to as high as 85% (for low pressure continuous catalytic regeneration units), especially in cases where a recontacting drum is used for higher hydrogen purity. The light hydrocarbons in the stream such as methane, ethane, propane, etc. will be preferentially adsorbed in the PSA while the hydrogen will flow through the unit. When the sorption bed reaches the end of its sorption portion of the cycle, the sorbed hydrocarbons and other sorbed impurities are removed by the reduction in pressure which accompanies the desorption portion of the cycle. The net effect of the operation is to increase the hydrogen purity of the recycle gas from between 55% and 85% up to values which may be as high as 90% or higher.

The advantage of removing the hydrocarbon impurities from the recycle gas is to reduce the circuit pressure drop and improve the hydrogen partial pressure of the recycle gas. Often it is the recycle gas compressor which limits the amount of feed that can be processed in a hydraulically constrained unit. In this case, if the proportion of hydrocarbons in the recycle gas stream is reduced, the mass and volume flow rates of the stream going through the feed preheat circuit, reactors, furnaces, and effluent circuit are reduced. As a result, the circuit pressure drop is reduced, and the feed rates may be increased due to the elimination of the recycle gas compressor limitations. The feed rate can therefore be increased until another constraint in the system is realized. In a similar manner, grass roots catalytic reforming units incorporating pressure swing adsorption may be designed to have a relatively greater capacity for a compressor of a given size.

In Conventional Pressure Swing Adsorption ("conventional PSA") a gaseous mixture is conducted under pressure for a period of time over a first bed of a solid sorbent that is selective or relatively selective for one or more components, usually regarded as a contaminant that is to be removed from the gas stream. It is possible to remove two or more contaminants simultaneously but for convenience, the component or components that are to be removed will be referred to in the singular and referred to as a contaminant. The gaseous mixture is passed over a first adsorption bed in a first vessel and emerges from the bed depleted in the contaminant that remains sorbed in the bed. After a predetermined time or, alternatively when a break-through of the contaminant is observed, the flow of the gaseous mixture is switched to a second adsorption bed in a second vessel for the purification to continue. While the second bed is in adsorption service, the sorbed contaminant is removed from the first adsorption bed by a reduction in pressure, usually accompanied by a reverse flow of gas to desorb the contaminant. As the pressure in the vessels is reduced, the contaminant previously adsorbed on the bed is progressively desorbed into the tail gas system that typically comprises a large tail gas drum, together with a control system designed to minimize pressure fluctuations to downstream systems. The contaminant can be collected from the tail gas system in any suitable manner and processed further or disposed of as appropriate. When desorption is complete, the sorbent bed may be purged with an inert gas stream, e.g., nitrogen or a purified stream of the process gas. Purging may be facilitated by the use of a higher temperature purge gas stream.

After, e.g., breakthrough in the second bed, and after the first bed has been regenerated so that it is again prepared for adsorption service, the flow of the gaseous mixture is switched from the second bed to the first bed, and the second bed is regenerated. The total cycle time is the length of time from when the gaseous mixture is first conducted to the first bed in a first cycle to the time when the gaseous mixture is first conducted to the first bed in the immediately succeeding cycle, i.e., after a single regeneration of the first bed. The use of third, fourth, fifth, etc. vessels in addition to the second vessel, as might be needed when adsorption time is short but desorption time is long, will serve to increase cycle time.

Thus, in one configuration, a pressure swing cycle will include a feed step, at least one depressurization step, a purge step, and finally a repressurization step to prepare the adsorbent material for reintroduction of the feed step. The sorption of the contaminants usually takes place by physical sorption onto the sorbent that is normally a porous solid such as activated carbon, alumina, silica or silica-alumina that has an affinity for the contaminant. Zeolites are often used in many applications since they may exhibit a significant degree of selectivity for certain contaminants by reason of their controlled and predictable pore sizes. Normally, chemical reaction with the sorbent is not favored in view of the increased difficulty of achieving desorption of species which have become chemically bound to the sorbent, but chemisorption is my no means to be excluded if the sorbed materials may be effectively desorbed during the desorption portion of the cycle, e.g., by the use of higher temperatures coupled with the reduction in pressure. Pressure swing adsorption processing is described more fully in the book entitled *Pressure Swing Adsorption*, by D. M. Ruthven, S. Farouq & K. S. Knaebel (VCH Publishers, 1994).

Conventional PSA possesses significant inherent disadvantages for a variety of reasons. For example, conventional PSA units are costly to build and operate and are significantly larger in size for the same amount of hydrogen that needs to be recovered from hydrogen-containing gas streams as compared to RCPSA. Also, a conventional pressure swing adsorption unit will generally have cycle times in excess of one minute, typically in excess of 2 to 4 minutes due to time limitations required to allow diffusion of the components through the larger beds utilized in conventional PSA and the equipment configuration and valving involved. In contrast, rapid cycle pressure swing adsorption is utilized which has total cycle times of less than one minute. The total cycle times of RCPSA may be less than 30 seconds, preferably less than 15 seconds, more preferably less than 10 seconds, even more preferably less than 5 seconds, and even more preferably less 2 seconds. Further, the rapid cycle pressure swing adsorption units used can make use of substantially different sorbents, such as, but not limited to, structured materials such as monoliths.

The overall adsorption rate of the adsorption processes, whether conventional PSA or RCPSA, is characterized by the mass transfer rate constant in the gas phase ($\tau_g$) and the mass transfer rate constant in the solid phase ($\tau_s$). A material's mass transfer rates of a material are dependent upon the adsorbent, the adsorbed compound, the pressure and the temperature. The mass transfer rate constant in the gas phase is defined as:

$$\tau_g = D_g/R_g^2 \text{ (in cm}^2\text{/sec)} \tag{1}$$

where $D_g$ is the diffusion coefficient in the gas phase and $R_g$ is the characteristic dimension of the gas medium. Here the gas diffusion in the gas phase, $D_g$, is well known in the art (i.e., the conventional value can be used) and the characteristic dimension of the gas medium, $R_g$ is defined as the channel width between two layers of the structured adsorbent material.

The mass transfer rate constant in the solid phase of a material is defined as:

$$\tau_s = D_s/R_s^2 \text{ (in cm}^2\text{/sec)} \tag{2}$$

where $D_s$ is the diffusion coefficient in the solid phase and $R_s$ is the characteristic dimension of the solid medium. Here the gas diffusion coefficient in the solid phase, $D_s$, is well known in the art (i.e., the conventional value can be used) and the characteristic dimension of the solid medium, $R_s$ is defined as the width of the adsorbent layer.

D. M. Ruthven & C. Thaeron, *Performance of a Parallel Passage Absorbent Contactor*, Separation and Purification Technology 12 (1997) 43-60, which is incorporated by reference, clarifies that for flow through a monolith or a structured adsorbent that channel width is a good characteristic dimension for the gas medium, $R_g$. U.S. Pat. No. 6,607,584 to Moreau et al., which is incorporated by reference, also describes the details for calculating these transfer rates and associated coefficients for a given adsorbent and the test standard compositions used for conventional PSA. Calculation of these mass transfer rate constants is well known to one of ordinary skill in the art and may also be derived by one of ordinary skill in the art from standard testing data.

Conventional PSA relies on the use of adsorbent beds of particulate adsorbents. Additionally, due to construction constraints, conventional PSA is usually comprised of 2 or more separate beds that cycle so that at least one or more beds is fully or at least partially in the feed portion of the cycle at any one time in order to limit disruptions or surges in the treated process flow. However, due to the relatively large size of conventional PSA equipment, the particle size of the adsorbent material is general limited particle sizes of about 1 mm and above. Otherwise, excessive pressure drop, increased cycle times, limited desorption, and channeling of feed materials will result.

In an embodiment, RCPSA bed length unit pressure drops, required adsorption activities, and mechanical constraints (due to centrifugal acceleration of the rotating beds in RCPSA), prevent the use of many conventional PSA adsorbent bed materials, in particular adsorbents that are in a loose pelletized, particulate, beaded, or extrudate form. In a preferred embodiment, adsorbent materials are secured to a supporting understructure material for use in an RCPSA rotating apparatus. For example, one embodiment of the rotary RCPSA apparatus can be in the form of adsorbent sheets comprising adsorbent material coupled to a structured reinforcement material. A suitable binder may be used to attach the adsorbent material to the reinforcement material. Non-limiting examples of reinforcement material include monoliths, a mineral fiber matrix, (such as a glass fiber matrix), a metal wire matrix (such as a wire mesh screen), or a metal foil (such as aluminum foil), which can be anodized. Examples of glass fiber matrices include woven and non-woven glass fiber scrims. The adsorbent sheets can be made by coating a slurry of suitable adsorbent component, such as zeolite crystals with binder constituents onto the reinforcement material, non-woven fiber glass scrims, woven metal fabrics, and expanded aluminum foils. In a particular embodiment, adsorbent sheets or material are coated onto ceramic supports.

An absorber in a RCPSA unit typically comprises an adsorbent solid phase formed from one or more adsorbent materials and a permeable gas phase through which the gases to be separated flow from the inlet to the outlet of the adsorber, with a substantial portion of the components desired to be removed from the stream adsorbing onto the solid phase of the adsorbent. This gas phase may be called "circulating gas phase", but more simply "gas phase". The solid phase includes a network of pores, the mean size of which is usually between approximately 0.02 µm and 20 µm. There may be a network of even smaller pores, called "micropores", this being encountered, for example, in microporous carbon adsorbents or zeolites. The solid phase may be deposited on a non-adsorbent support, the primary function of which is to provide mechanical strength for the active adsorbent materials and/or provide a thermal conduction function or to store heat. The phenomenon of adsorption comprises two main steps, namely passage of the adsorbate from the circulating gas phase onto the surface of the solid phase, followed by passage of the adsorbate from the surface to the volume of the solid phase into the adsorption sites.

In an embodiment, RCPSA utilizes a structured adsorbent which is incorporated into the tubes utilized in the RSPCA apparatus. These structured adsorbents have an unexpectedly high mass transfer rate since the gas flows through the channels formed by the structured sheets of the adsorbent which offers a significant improvement in mass transfer as compared to a traditional packed fixed bed arrangement as utilized in conventional PSA. The ratio of the transfer rate of the gas phase ($\tau_g$) and the mass transfer rate of the solid phase ($\tau_s$) in the current invention is greater than 10, preferably greater than 25, more preferably greater than 50. These extraordinarily high mass transfer rate ratios allow RCPSA to produce high purity hydrogen streams at high recovery rates with only a fraction of the equipment size, adsorbent volume, and cost of conventional PSA.

The structured adsorbent embodiments also results in significantly greater pressure drops to be achieved through the adsorbent than conventional PSA without the detrimental effects associated with particulate bed technology. The adsorbent beds can be designed with adsorbent bed unit length pressure drops of greater than 5 inches of water per foot of bed length, more preferably greater than 10 in. $H_2O$/ft, and even more preferably greater than 20 in. $H_2O$/ft. This is in contrast with conventional PSA units where the adsorbent bed unit length pressure drops are generally limited to below about 5 in. $H_2O$/ft depending upon the adsorbent used, with most conventional PSA units being designed with a pressure drop of about 1 in. $H_2O$/ft or less to minimize the problems discussed that are associated with the larger beds, long cycle time, and particulate absorbents of conventional PSA units. The adsorbent beds of conventional PSA cannot accommodate higher pressure drops because of the risk of fluidizing the beds which results in excessive attrition and premature unit shutdowns due to accompanying equipment problems and/or a need to add or replace lost adsorbent materials. These markedly higher adsorbent bed unit length pressure drops allow RCPSA adsorbent beds to be significantly more compact, shorter, and efficient than those utilized in conventional PSA.

In an embodiment, high unit length pressure drops allow high vapor velocities to be achieved across the structured adsorbent beds. This results in a greater mass contact rate between the process fluids and the adsorbent materials in a unit of time than can be achieved by conventional PSA. This results in shorter bed lengths, higher gas phase transfer rates ($\tau_g$) and improved hydrogen recovery. With these significantly shorter bed lengths, total pressure drops of the RSCPA application of the present invention can be maintained at total bed pressure differentials during the feed cycle of about 0.5 to 50 psig, preferably less than 30 psig, while minimizing the length of the active beds to normally less than 5 feet in length, preferably less than 2 feet in length and as short as less than 1 foot in length.

The absolute pressure levels employed during the RCPSA process are not critical. In practice, provided that the pressure differential between the adsorption and desorption steps is sufficient to cause a change in the adsorbate fraction loading on the adsorbent thereby providing a delta loading effective for separating the stream components processed by the RCPSA unit. Typical absolute operating pressure levels range from about 50 to 2500 psia. However, it should be noted that the actual pressures utilized during the feed, depressurization, purge and repressurization stages are highly dependent upon many factors including, but not limited to, the actual operating pressure and temperature of the overall stream to be separated, stream composition, and desired recovery percentage and purity of the RCPSA product stream. The RCPSA process is not specifically limited to any absolute pressure and due to its compact size becomes incrementally more economical than conventional PSA processes at the higher operating pressures. U.S. Pat. Nos. 6,406,523; 6,451,095; 6,488,747; 6,533,846 and 6,565,635, all of which are incorporated herein by reference, disclose various aspects of RCPSA technology.

In an embodiment and an example, the rapid cycle pressure swing adsorption system has a total cycle time, $t_{TOT}$, to separate a feed gas into product gas (in this case, a hydrogen-enriched stream) and a tail (exhaust) gas. The method generally includes the steps of conducting the feed gas having a hydrogen purity F %, where F is the percentage of the feed gas which is the weakly-adsorbable (hydrogen) component, into an adsorbent bed that selectively adsorbs the tail gas and passes the hydrogen product gas out of the bed, for time, $t_F$, wherein the hydrogen product gas has a purity of P % and a rate of recovery of R %. Recovery R % is the ratio of amount of hydrogen retained in the product to the amount of hydrogen available in the feed. Then the bed is co-currently depressurized for a time, $t_{CO}$, followed by counter-currently depressurizing the bed for a time, $t_{CN}$, wherein desorbate (tail gas or exhaust gas) is released from the bed at a pressure greater than or equal to 1 psig. The bed is purged for a time, $t_P$, typically with a portion of the hydrogen product gas. Subsequently the bed is repressurized for a time, $t_{RP}$, typically with a portion of hydrogen product gas or feed gas, wherein the cycle time, $t_{TOT}$, is equal to the sum of the individual cycle times comprising the total cycle time, i.e.:

$$t_{TOT}=t_F+t_{CO}+t_{CN}+t_P+t_{RP} \quad (3)$$

This embodiment encompasses, but is not limited to, RCPSA processes such that either the rate of recovery, R %>80% for a product purity to feed purity ratio, P %/F %>1.1, and/or the rate of recovery, R %>90% for a product purity to feed purity ratio, 0<P %/F %<1.1. Results supporting these high recovery & purity ranges can be found in Examples 4 through 10 herein. Other embodiments will include applications of RCPSA in processes where hydrogen recovery rates are significantly lower than 80%. Embodiments of RCPSA are not limited to exceeding any specific recovery rate or purity thresholds and can be as applied at recovery rates and/or purities as low as desired or economically justifiable for a particular application.

It should also be noted that it is within the scope of this invention that steps $t_{CO}$, $t_{CN}$, or $t_P$ of equation (3) above can be omitted together or in any individual combination. However it is preferred that all steps in the above equation (3) be performed or that only one of steps $t_{CO}$ or $t_{CN}$ be omitted from the total cycle. However, additional steps can also be added within a RCPSA cycle to aid in enhancing purity and recovery of hydrogen. Thus enhancement could be practically achieved in RCPSA because of the small portion of absorbent needed and due to the elimination of a large number of stationary valves utilized in conventional PSA applications.

In an embodiment, the tail gas is also preferably released at a pressure high enough so that the tail gas may be fed to another device absent tail gas compression. More preferably the tail gas pressure is greater than or equal to 60 psig. In a most preferred embodiment, the tail gas pressure is greater than or equal to 80 psig. At higher pressures, the tail gas can be conducted to a fuel header.

Practice of the present invention can have the following benefits:

(a) Increasing the purity of hydrogen-containing stream(s) available as makeup gas, or of streams which must be upgraded to higher purity before they are suitable as make-up gas.

(b) Increasing the purity of hydrogen-containing recycle gas streams resulting in an increase in overall hydrogen treat gas purity in the reforming reactions to achieve higher reforming capacity or severity at lower pressures.

(c) Debottlenecking existing catalytic reformer recycle compression circuits by reducing the light hydrocarbons in the recycle stream and improving the recycle stream hydrogen purity.

In hydroprocessing, increased $H_2$ purity translates to higher $H_2$ partial pressures in the hydroprocessing reactor(s). This both increases the reaction kinetics and decreases the rate of catalyst deactivation. The benefits of higher $H_2$ partial pressures can be exploited in a variety of ways, such as: operating at lower reactor temperature, which reduces energy costs, decreases catalyst deactivation, and extends catalyst life; increasing unit feed rate; processing more sour (higher sulfur) feedstocks; processing higher concentrations of cracked feedstocks; improved product color, particularly near end of run; debottlenecking existing compressors and/or treat gas circuits (increased scf $H_2$ at constant total flow, or same scf $H_2$ at lower total flow); and other means that would be apparent to one skilled in the art.

Increased $H_2$ recovery also offers significant potential benefits, some of which are described as follows:

(i) reducing the demand for purchased, manufactured, or other sources of $H_2$ within the refinery;

(ii) increasing hydroprocessing feed rates at constant (existing) makeup gas demands as a result of the increased hydrogen recovery;

(iii) improving the hydrogen purity in hydroprocessing for increased heteroatom removal efficiencies;

(iv) removing a portion of the $H_2$ from refinery fuel gas which is detrimental to the fuel gas due to hydrogen's low BTU value which can present combustion capacity limitations and difficulties for some furnace burners;

(v) Other benefits that would be apparent to one knowledgeable in the art.

The following examples are presented for illustrative purposes only and should not be cited as being limiting in any way.

EXAMPLES

Example 1

In this example, the refinery stream is at 480 psig with tail gas at 65 psig whereby the pressure swing is 6.18. The feed composition and pressures are typical of refinery processing units such as those found in hydroprocessing or hydrotreating applications. In this example typical hydrocarbons are described by their carbon number i.e. $C_1$=methane, $C_2$=ethane etc. The RCPSA is capable of producing hydrogen at >99% purity and >81% recovery over a range of flow rates. Tables 1a and 1b show the results of computer simulation of the RCPSA and the input and output percentages of the different components for this example. Tables 1a and 1b also show how the hydrogen purity decreases as recovery is increased from 89.7% to 91.7% for a 6 MMSCFD stream at 480 psig and tail gas at 65 psig.

Tables 1a & 1b

Composition (mol %) of Input and Output from RCPSA (67 ft$^3$) in H2 Purification Feed is at 480 psig, 122 deg F. and Tail Gas at 65 psig. Feed rate is about 6 MMSCFD

TABLE 1a

Higher purity
Step Times in seconds are $t_F = 1$, $t_{CO} = 0.167$, $t_{CN} = 0$,
$t_P = 0.333$, $t_{RP} = 0.5$
H2 at 98.6% purity, 89.7% recovery

|  | feed | product | Tail-Gas |
|---|---|---|---|
| H2 | 88.0 | 98.69 | 45.8. |
| C1 | 6.3 | 1.28 | 25.1 |
| C2 | 0.2 | 0.01 | 1.0 |
| C3 | 2.6 | 0.01 | 12.3 |
| C4+ | 2.9 | 0.00 | 14.8 |
| H2O | 2000 vppm | 65 vppm | 9965 vppm |
| total (MMSCFD) | 6.162 | 4.934 | 1.228 |
|  | 480 psig | 470 psig | 65 psig |

TABLE 1b

Higher purity
Step Times in seconds are $t_F = 1$, $t_{CO} = 0.333$, $t_{CN} = 0$,
$t_P = 0.167$, $t_{RP} = 0.5$
H2 at 97.8% purity, 91.7% recovery

|  | feed | product | Tail-Gas |
|---|---|---|---|
| H2 | 88.0 | 97.80 | 45.9 |
| C1 | 6.3 | 2.14 | 25.0 |
| C2 | 0.2 | 0.02 | 1.0 |
| C3 | 2.6 | 0.02 | 12.3 |
| C4+ | 2.9 | 0.00 | 14.9 |
| H2O | 2000 vppm | 131 vppm | 10016 vpm |
| total (MMSCFD) | 6.160 | 5.085 | 1.074 |
|  | 480 psig | 470 psig | 65 psig |

The RCPSA's described in the present invention operate a cycle consisting of different steps. Step 1 is feed during which product is produced, step 2 is co-current depressurization, step 3 is counter-current depressurization, step 4 is purge, usually counter-current) and step 5 is repressurization with product. In the RCPSA's described here at any instant half the total number of beds are on the feed step. In this example, $t_{TOT}$=2 sec in which the feed time, $t_F$, is one-half of the total cycle.

Example 2

In this example, the conditions are the same as in Example 1. Table 2a shows conditions utilizing both a co-current and counter-current steps to achieve hydrogen purity >99%. Table 2b shows that the counter-current depressurization step may be eliminated, and a hydrogen purity of 99% can still be maintained. In fact, this shows that by increasing the time of the purge cycle, $t_P$, by the duration removed from the counter-current depressurization step, $t_{CN}$, that hydrogen recovery can be increased to a level of 88%.

Tables 2a & 2b

Effect of Step Durations on H2 Purity and Recovery from an RCPSA (67 Ft$^3$)

Same Conditions as Table 1. Feed is at 480 psig, 122 deg F. and Tail Gas at 65 psig. Feed Rate is about 6 MMSCFD

TABLE 2a

With counter-current depress, Intermediate pressure = 105 psig

| purity % | recovery % | $t_F$ s | $t_{CO}$ s | $t_{CN}$ s | $t_P$ s | $t_{RP}$ s |
|---|---|---|---|---|---|---|
| 98.2 | 84.3 | 1 | 0.283 | 0.05 | 0.167 | 0.5 |
| 98.3 | 85 | 1 | 0.166 | 0.167 | 0.167 | 0.5 |
| 99.9 | 80 | 1 | 0.083 | 0.25 | 0.167 | 0.5 |

TABLE 2b

Without counter-current depress

| purity % | recovery % | $t_F$ s | $t_{CO}$ s | $t_{CN}$ s | $t_P$ s | $t_{RP}$ s |
|---|---|---|---|---|---|---|
| 97.8 | 91.7 | 1 | 0.333 | 0 | 0.167 | 0.5 |
| 98.7 | 90 | 1 | 0.166 | 0 | 0.334 | 0.5 |
| 99 | 88 | 1 | 0.083 | 0 | 0.417 | 0.5 |

Example 3

This example shows a 10 MMSCFD refinery stream, once again containing typical components, as shown in feed column of Table 3 (e.g. the feed composition contains 74% $H_2$). The stream is at 480 psig with RCPSA tail gas at 65 psig whereby the absolute pressure swing is 6.18. Once again the RCPSA of the present invention is capable of producing hydrogen at >99% purity and >85% recovery from these feed compositions. Tables 3a and 3b show the results of this example.

Tables 3a & 3b

Composition (mol %) of Input and Output from RCPSA (53 Ft$^3$) in H2 Purification. Feed is at 480 psig, 101 deg F. and Tail Gas at 65 psig. Feed Rate is about 10 MMSCFD TABLE 3a Higher purity
Step Times in seconds are $t_F = 0.583$, $t_{CO} = 0.083$, $t_{CN} = 0$, $t_P = 0.25$, $t_{RP} = 0.25$
H2 at 99.98% purity and 86% recovery

|  | feed | product | Tail-Gas |
|---|---|---|---|
| H2 | 74.0 | 99.98 | 29.8 |
| C1 | 14.3 | 0.02 | 37.6 |
| C2 | 5.2 | 0.00 | 13.8 |
| C3 | 2.6 | 0.00 | 7.4 |
| C4+ | 3.9 | 0.00 | 11.0 |
| H2O | 2000 vppm | 0.3 vppm | 5387 vppm |
| total (MMSCFD) | 10.220 | 6.514 | 3.705 |
|  | 480 psig | 470 psig | 65 psig |

TABLE 3b

Lower purity
Step Times in seconds are $t_F = 0.5$, $t_{CO} = 0.167$, $t_{CN} = 0$, $t_P = 0.083$, $t_{RP} = 0.25$
H2 at 93% purity and 89% recovery

|  | feed | product | Tail-Gas |
|---|---|---|---|
| H2 | 74.0 | 93.12 | 29.3 |
| C1 | 14.3 | 6.34 | 31.0 |
| C2 | 5.2 | 0.50 | 16.6 |
| C3 | 2.6 | 0.02 | 8.9 |
| C4+ | 3.9 | 0.00 | 13.4 |
| H2O | 2000 vppm | 142 vppm | 6501 vpm |
| total (MMSCFD) | 10.220 | 7.240 | 2.977 |
|  | 480 psig | 470 psig | 65 psig |

In both cases shown in Tables 3a and 3b above, although tail gas pressure is high at 65 psig, the present invention shows that high purity (99%) may be obtained if the purge step, $t_P$, is sufficiently increased.

Tables 2a, 2b and 3a show that for both 6 MMSCFD and 10 MMSCFD flow rate conditions, very high purity hydrogen at ~99% and >85% recovery is achievable with the RCPSA. In both cases the tail gas is at 65 psig. Such high purities and recoveries of product gas achieved using the RCPSA with all the exhaust produced at high pressure have not been discovered before and are a key feature of the present invention.

Table 3c shows the results for an RCPSA (volume=49 cubic ft) that delivers high purity (>99%) H$_2$ at high recovery for the same refinery stream discussed in Tables 3a and 3b. As compared to Table 3a, Table 3c shows that similar purity and recovery rates can be achieved by simultaneously decreasing the duration of the feed cycle, $t_F$, and the purge cycle, $t_P$.

TABLE 3c

Effect of step durations on H2 purity and recovery from an RCPSA (49 ft$^3$). Feed is at 480 psig, 101 deg F. and Tail gas at 65 psig. Feed rate is about 10 MMSCFD. Without counter-current depress

| purity % | recovery % | $t_F$ s | $t_{CO}$ s | $t_{CN}$ s | $t_P$ s | $t_{RP}$ s |
|---|---|---|---|---|---|---|
| 95.6 | 87.1 | 0.5 | 0.167 | 0 | 0.083 | 0.25 |
| 97.6 | 86 | 0.5 | 0.117 | 0 | 0.133 | 0.25 |
| 99.7 | 85.9 | 0.5 | 0.083 | 0 | 0.167 | 0.25 |

Example 4

In this example, Table 4 further illustrates the performance of RCPSA's operated in accordance with the invention being described here. In this example, the feed is a typical refinery stream and is at a pressure of 300 psig. The RCPSA of the present invention is able to produce 99% pure hydrogen product at 83.6% recovery when all the tail gas is exhausted at 40 psig. In this case the tail gas can be sent to a flash drum or other separator or other downstream refinery equipment without further compression requirement. Another important aspect of this invention is that the RCPSA also removes CO to <2 vppm, which is extremely desirable for refinery units that use the product hydrogen enriched stream. Lower levels of CO ensure that the catalysts in the downstream units operate without deterioration in activity over extended lengths. Conventional PSA cannot meet this CO specification and simultaneously also meet the condition of exhausting all the tail gas at the higher pressure, such as at typical fuel header pressure or the high pressure of other equipment that processes such RCPSA exhaust. Since all the tail gas is available at 40 psig or greater, no additional compression is required for integrating the RCPSA with refinery equipment.

TABLE 4

Composition (mol %) of input and output from RCPSA (4 ft$^3$) in carbon monoxide and hydrocarbon removal from hydrogen. Feed is at 300 psig, 101 deg F, and Feed rate is about 0.97 MMSCFD.
Step Times in seconds are $t_F = 0.5$, $t_{CO} = 0.1$, $t_{CN} = 0$, $t_P = 0.033$, $t_{RP} = 0.066$
H2 at 99.99% purity and 88% recovery

|  | feed | product | Tail-Gas |
|---|---|---|---|
| H2 | 89.2 | 99.98 | 48.8 |
| C1 | 3.3 | 0.01 | 13.9 |
| C2 | 2.8 | 0.01 | 13.9 |
| C3 | 2.0 | 0.00 | 10.2 |
| C4+ | 2.6 | 0.00 | 13.2 |
| CO | 50 | 1.1 | 198.4 |
| total | 0.971 | 0.760 | 0.211 |
|  | 300 psig | 290 psig | 40 psig |

Example 5

Tables 5a and 5b compare the performance of RCPSA's operated in accordance with the invention being described here. The stream being purified has lower H$_2$ in the feed (51% mol) and is a typical refinery/petrochemical stream. In both cases (corresponding to Tables 5a and 5b), a counter current depressurization step is applied after the co-current step. In accordance with the invention, Table 5a shows that high H$_2$ recovery (81%) is possible even when all the tail gas is released at 65 psig or greater. In contrast, the RCPSA where some tail-gas is available as low as 5 psig, loses hydrogen in the counter-current depressurization such that H$_2$ recovery drops to 56%. In addition, the higher pressure of the stream in Table 5a indicates that no tail gas compression is required.

Tables 5a & 5b

Effect of Tail Gas Pressure on Recovery

Example of RCPSA Applied to a Feed with H2 Concentration (51.3 mol %) Composition (mol %) of Input and Output from RCPSA (31 ft$^3$) in H2 Purification Feed is at 273 psig, 122 deg F. and Feed Rate is about 5.1 MMSCFD TABLE 5a Step Times in seconds are $t_F = 0.5$, $t_{CO} = 0.083$, $t_{CN} = 0.033$, $t_P = 0.25$, $t_{RP} = 0.133$
[a] Tail gas available from 65-83 psig, H2 at 99.7% purity and 81% recovery

|  | feed | product | Tail-Gas |
|---|---|---|---|
| H2 | 51.3 | 99.71 | 20.1 |
| C1 | 38.0 | 0.29 | 61.0 |
| C2 | 4.8 | 0.00 | 8.0 |
| C3 | 2.2 | 0.00 | 3.8 |
| C4+ | 3.7 | 0.00 | 6.4 |
| H2O | 4000 vppm | 0.7 vppm | 6643 vppm |
| total (MMSCFD) | 5.142 | 2.141 | 3.001 |
|  | 273 psig | 263 psig | 65-83 psig |

TABLE 5b

Step Times in sec. are $t_F = 0.667$, $t_{CO} = 0.167$, $t_{CN} = 0.083$, $t_P = 0.083$, $t_{RP} = 0.33$
[b] Tail gas available from 5-65 psig, H2 at 99.9% purity and 56% recovery

|  | feed | product | Tail-Gas |
|---|---|---|---|
| H2 | 51.3 | 99.99 | 34.2 |
| C1 | 38.0 | 0.01 | 48.8 |
| C2 | 4.8 | 0.00 | 6.9 |
| C3 | 2.2 | 0.00 | 3.4 |
| C4+ | 3.7 | 0.00 | 6.2 |
| H2O | 4000 vppm | 0.0 vppm | 5630 vppm |
| total (MMSCFD) | 5.142 | 1.490 | 3.651 |
|  | 273 psig | 263 psig | 5-65 psig |

Example 6

In this example, Tables 6a and 6b compare the performance of RCPSA's operated in accordance with the invention being described here. In these cases, the feed pressure is 800 psig and tail gas is exhausted at either 65 psig or at 100 psig. The composition reflects typical impurities such H2S, which can be present in such refinery applications. As can be seen, high recovery (>80%) is observed in both cases with the high purity >99%. In both these cases, only a co-current depressurization is used and the effluent during this step is sent to other beds in the cycle. Tail gas only issues during the countercurrent purge step. Table 6c shows the case for an RCPSA operated where some of the tail gas is also exhausted in a countercurrent depressurization step following a co-current depressurization. The effluent of the co-current depressurization is of sufficient purity and pressure to be able to return it one of the other beds in the RCPSA vessel configuration that is part of this invention. Tail gas i.e., exhaust gas, issues during the counter-current depressurization and the counter-current purge steps.

In all cases the entire amount of tail gas is available at elevated pressure which allows for integration with other high pressure refinery process. This removes the need for any form of required compression while producing high purity gas at high recoveries. In accordance with the broad claims of this invention, these cases are only to be considered as illustrative examples and not limiting either to the refinery, petrochemical or processing location or even to the nature of the particular molecules being separated.

Tables 6a, 6b, & 6c

Example of RCPSA Applied to a High Pressure Feed Composition (mol %) of Input and Output from RCPSA (18 ft$^3$) in H2 Purification Feed is at 800 psig, 122 deg F. and Feed Rate is about 10.1 MMSCFD 6a. Step Times in seconds are $t_F = 0.91$, $t_{CO} = 0.25$, $t_{CN} = 0$, $t_P = 0.33$, $t_{RP} = 0.33$
[a] Tail gas at 65 psig, H2 at 99.9% purity and 87% recovery

|  | feed | product | Tail-Gas |
|---|---|---|---|
| H2 | 74.0 | 99.99 | 29.5 |
| C1 | 14.3 | 0.01 | 37.6 |
| C2 | 5.2 | 0.00 | 14.0 |
| C3 | 2.6 | 0.00 | 7.4 |
| C4+ | 3.9 | 0.00 | 10.9 |
| H2S | 20 vppm | 0 | 55 vppm |
| total (MMSCFD) | 10.187 | 6.524 | 3.663 |
|  | 800 psig | 790 psig | 65 psig |

6b. Step Times in seconds are $t_F = 0.91$, $t_{CO} = 0.25$, $t_{CN} = 0$, $t_P = 0.33$, $t_{RP} = 0.33$
[b] Tail gas at 100 psig, H2 at 99.93% purity and 80.3% recovery

|  | feed | product | Tail-Gas |
|---|---|---|---|
| H2 | 74.0 | 99.93 | 38.1 |
| C1 | 14.3 | 0.07 | 32.8 |
| C2 | 5.2 | 0.00 | 12.5 |
| C3 | 2.6 | 0.00 | 6.5 |
| C4+ | 3.9 | 0.00 | 9.6 |
| H2S | 20 vppm | 0 vppm | 49 vppm |
| total (MMSCFD) | 10.187 | 6.062 | 4.125 |
|  | 800 psig | 790 psig | 100 psig |

6c. Step times in seconds are $t_F = 0.91$, $t_{CO} = 0.083$, $t_{CN} = 0.25$, $t_P = 0.167$, $t_{RP} = 0.41$
[c] Tail gas from 65-100 psig, H2 at 99.8% purity and 84% recovery

|  | feed | product | Tail-Gas |
|---|---|---|---|
| H2 | 74.0 | 99.95 | 28.9 |
| C1 | 14.3 | 0.05 | 39.0 |
| C2 | 5.2 | 0.00 | 13.7 |
| C3 | 2.6 | 0.00 | 7.2 |
| C4+ | 3.9 | 0.00 | 10.6 |
| H2S | 20 vppm | 0.01 vppm | 53 vppm |
| total (MMSCFD) | 10.187 | 6.373 | 3.814 |
|  | 800 psig | 790 psig | 65-100 psig |

Example 7

Tables 7a, 7b, and 7c compare the performance of RCP-SA's operated in accordance with the invention being described here. The stream being purified has higher $H_2$ in the feed (85% mol) and is a typical refinery/petrochemical stream. In these examples the purity increase in product is below 10% (i.e. P/F<1.1). Under this constraint, the method of the present invention is able to produce hydrogen at >90% recovery without the need for tail gas compression.

Tables 7a, 7b, & 7c

Example of RCPSA Applied to a Feed with H2 Concentration (85 Mol %)

Composition (Mol %) of Input and Output from RCPSA (6.1 ft³)

Feed is at 480 Psig, 135 Deg F. and Feed Rate is about 6 MMSCFD

7a. Step Times in seconds are $t_F = 0.5$, $t_{CO} = 0.33$, $t_{CN} = 0.167$, $t_P = 0.167$, $t_{RP} = 1.83$ recovery = 85%

|  | feed | product | Tail-Gas |
|---|---|---|---|
| H2 | 85.0 | 92.40 | 57.9 |
| C1 | 8.0 | 4.56 | 17.9 |
| C2 | 4.0 | 1.79 | 13.1 |
| C3 | 3.0 | 1.16 | 10.4 |
| C4+ | 0.0 | 0.00 | 0.0 |
| H2O | 2000 | 866.5 | 6915 |
| total (MMSCFD) | 6.100 | 4.780 | 1.320 |
|  | 480 psig | 470 psig | 65 psig |

7b. Step Times in sec. are $t_F = 1$, $t_{CO} = 0.333$, $t_{CN} = 0.167$, $t_P = 0.083$, $t_{RP} = 0.417$ recovery = 90%

|  | feed | product | Tail-Gas |
|---|---|---|---|
| H2 | 85.0 | 90.90 | 58.2 |
| C1 | 8.0 | 5.47 | 18.1 |
| C2 | 4.0 | 2.23 | 12.9 |
| C3 | 3.0 | 1.29 | 10.1 |
| C4+ | 0.0 | 0.00 | 0.0 |
| H2O | 2000 | 1070.5 | 6823 |
| total (MMSCFD) | 6.120 | 5.150 | 0.969 |
|  | 480 psig | 470 psig | 65 psig |

7c. Step Times in sec. are $t_F = 2$, $t_{CO} = 0.667$, $t_{CN} = 0.333$, $t_P = 0.167$, $t_{RP} = 0.833$ recovery = 90%

|  | feed | product | Tail-Gas |
|---|---|---|---|
| H2 | 85.0 | 90.19 | 55.2 |
| C1 | 8.0 | 6.21 | 18.8 |
| C2 | 4.0 | 2.32 | 13.9 |
| C3 | 3.0 | 1.17 | 11.3 |
| C4+ | 0.0 | 0.00 | 0.0 |
| H2O | 2000 | 1103.5 | 7447 |
| total (MMSCFD) | 6.138 | 5.208 | 0.93 |
|  | 480 psig | 470 psig | 65 psig |

The invention claimed is:

1. A catalytic naphtha reforming process comprising:
   a) contacting a hydrocarbon feed stream in the naphtha boiling range with a reforming catalyst under reforming conditions in reformer reactors in the presence of a purified recycle gas stream to produce a final reactor effluent;
   b) separating said final reactor effluent into a liquid phase reformate product and a vapor phase intermediate gas stream;
   c) conducting said vapor phase intermediate gas stream to a rapid cycle pressure swing adsorption zone comprising more than one adsorbent bed with a total cycle time, $t_{TOT}$, of less than 30 seconds and the pressure drop across each adsorbent bed is greater than 5 in-$H_2$O/ft of adsorbent bed length, wherein a purified hydrogen-containing gas stream which is higher in hydrogen concentration by volume than said vapor phase intermediate gas stream is produced;
   d) conducting at least a portion of said purified hydrogen-containing gas stream as a said purified recycle gas stream for use in step a);
   wherein the total cycle time, $t_{TOT}$, is equal to the sum of the individual cycle times comprising the total cycle time given by the formula:

$$t_{TOT}=t_F+t_{CO}+t_{CN}+t_P+t_{RP}$$

where
   $t_F$=a time period for conducting the vapor phase intermediate gas stream into the rapid cycle pressure swing adsorption unit which adsorbs the gaseous compounds other than hydrogen, and passing hydrogen out of the rapid cycle pressure swing adsorption unit;
   $t_{CO}$=a co-current depressurization time;
   $t_{CN}$=a counter-current depressurization time;
   $t_P$ a purge time;
   $t_{RP}$=a repressurization time;
   and wherein when the hydrogen product purity to feed purity ratio, P %/F %, is greater than 1.1, the rate of hydrogen recovery, R %, is greater than 80%; and when the hydrogen product purity to feed purity ratio, P %/F %, is less than 1.1, the rate of hydrogen recovery, R %, is greater than 90%,
   wherein the ratio of the transfer rate of the gas phase, $\tau_g$, and the mass transfer rate of the solid phase, $\tau_s$, of the rapid cycle pressure swing adsorption unit is greater than 10.

2. The process of claim 1, wherein a portion of said vapor phase intermediate gas stream is removed as an export hydrogen stream prior to conducting said vapor phase intermediate gas stream to said pressure swing adsorption process.

3. The process of claim 1, wherein the rapid cycle pressure swing adsorption process total cycle time is less than 10 seconds and the pressure drop across each adsorbent bed is greater than 10 in-$H_2$O/ft of adsorbent bed length.

4. The process of claim 3, wherein the rapid cycle pressure swing adsorption process total cycle time is less than 5 seconds.

5. The process of claim 4, wherein the pressure drop across each adsorbent bed is greater than 20 in-$H_2$O/ft of adsorbent bed length.

6. The process of claim 2, wherein the rapid cycle pressure swing adsorption process total cycle time is less than 5 seconds and the pressure drop across each adsorbent bed is greater than 10 in-$H_2$O/ft of adsorbent bed length.

7. The process of claim 6, wherein the pressure drop across each adsorbent bed is greater than 20 in-$H_2$O/ft of adsorbent bed length.

8. The process of claim 6, wherein the purified hydrogen-containing gas stream contains greater than 85% hydrogen by volume.

9. The process of claim 8, wherein the purified hydrogen-containing gas stream contains greater than 90% hydrogen by volume.

10. The process of claim 9, wherein the purified hydrogen-containing gas stream contains greater than 95% hydrogen by volume.

11. The process of claim 9, wherein said reforming reactors are of the fixed bed type.

12. The process of claim 9, wherein said reforming reactors are of the moving bed type.

13. The process of claim 9, wherein the total volumetric rate of hydrogen for an existing reforming unit recycle gas stream is increased as a result of the rapid cycle pressure swing adsorption process.

14. The process of claim 10, wherein the total volumetric rate of hydrogen for an existing reforming unit recycle gas stream is increased as a result of the rapid cycle pressure swing adsorption process.

15. The process of claim 1, wherein the reforming catalyst contains at least one of platinum, palladium, tin, rhenium, germanium, alumina, silica, silica-alumina, zeolite, or a halogen.

16. The process of claim 4, wherein the reforming catalyst contains at least one of platinum, palladium, tin, rhenium, germanium, alumina, silica, silica-alumina, zeolite, or a halogen.

17. The process of claim 9, wherein the reforming catalyst contains at least one of platinum, palladium, tin, rhenium, germanium, alumina, silica, silica-alumina, zeolite, or a halogen.

18. The process of claim 1, wherein the ratio of the transfer rate of the gas phase, $\tau_g$, and the mass transfer rate of the solid phase, $\tau_s$, of the rapid cycle pressure swing adsorption unit is greater than 25.

19. A catalytic naphtha reforming process comprising:
   a) contacting a hydrocarbon feed stream in the naphtha boiling range with a reforming catalyst under reforming conditions in reformer reactors in the presence of a purified recycle gas stream to produce a final reactor effluent;
   b) separating said final reactor effluent into a liquid ase reformate product and a vapor phase intermediate gas stream;
   c) conducting said vapor phase intermediate gas stream to a rapid cycle pressure swing adsorption zone comprising more than one adsorbent bed, the more than one adsorbent bed containing a structured adsorbent, with a total cycle time, $t_{TOT}$, of less than 30 seconds and the pressure drop across each adsorbent bed is greater than 5 in-$H_2O$/ft of adsorbent bed length, wherein a purified hydrogen-containing gas stream which is higher in hydrogen concentration by volume than said vapor phase intermediate gas stream is produced;
   d) conducting at least a portion of said purified hydrogen-containing gas stream as a said purified recycle gas stream for use in step a);

wherein the total cycle time, $t_{TOT}$, is equal to the sum of the individual cycle times comprising the total cycle time given by the formula:

$$t_{TOT} = t_F + t_{CO} + T_{CN} + t_P + t_{RP}$$

where
   $t_F$ = a tune period for conducting the vapor phase intermediate gas stream into the rapid cycle pressure swing adsorption unit which adsorbs the gaseous compounds other than hydrogen, and passing hydrogen out of the rapid cycle pressure swing adsorption unit;
   $t_{CO}$ = a co-current depressurization time;
   $t_{CN}$ = a counter-current depressurization time;
   $t_P$ = a purge time;
   $t_{RP}$ a repressurization time;

and wherein when the hydrogen product purity to feed purity ratio, P %/F %, is greater than 1.1, the rate of hydrogen recovery, R %, is greater than 80%; and when the hydrogen product purity to feed purity ratio, P %/F %, is less than 1.1, the rate of hydrogen recovery, R %, is greater than 90%, wherein the ratio of the transfer rate of the gas phase, $\tau_s$, and the mass transfer rate of the solid phase, $\tau_s$, of the rapid cycle pressure swing adsorption unit is greater than 10.

* * * * *